(12) United States Patent
Rumbaut et al.

(10) Patent No.: US 8,846,122 B2
(45) Date of Patent: Sep. 30, 2014

(54) PROCESS AND PRODUCT

(75) Inventors: Luc Joseph Paul Antoine Marie Rumbaut, Lebbeke-Wieze (BE); Maiike Geri Minnaert, Lebbeke-Wieze (BE)

(73) Assignee: Barry Callebaut AG, Zurich (CH)

( * ) Notice: Subject to any disclaimer, the term of this patent is extended or adjusted under 35 U.S.C. 154(b) by 495 days.

(21) Appl. No.: 12/745,329

(22) PCT Filed: Nov. 27, 2008

(86) PCT No.: PCT/IB2008/003698
§ 371 (c)(1),
(2), (4) Date: Sep. 7, 2010

(87) PCT Pub. No.: WO2009/068999
PCT Pub. Date: Jun. 4, 2009

(65) Prior Publication Data
US 2011/0052771 A1 Mar. 3, 2011

(30) Foreign Application Priority Data
Nov. 28, 2007 (GB) .................................. 0723255.6

(51) Int. Cl.
A23G 1/00 (2006.01)

(52) U.S. Cl.
CPC ............ *A23G 1/0069* (2013.01); *A23G 1/0009* (2013.01)
USPC ........... 426/285; 426/512; 426/519; 426/593; 426/631

(58) Field of Classification Search
USPC ........................................................ 426/285
See application file for complete search history.

(56) References Cited

U.S. PATENT DOCUMENTS

| | | | |
|---|---|---|---|
| 3,098,746 A | 7/1963 | Noznick et al. | |
| 3,184,315 A | 5/1965 | Wolf | |
| 4,084,011 A | 4/1978 | Chevalley et al. | |
| 4,308,288 A | 12/1981 | Hara et al. | |
| 5,358,727 A | 10/1994 | Yates et al. | |
| 6,129,940 A | 10/2000 | Leadbeater | |
| 6,270,826 B1 | 8/2001 | Kashulines et al. | |
| 6,309,689 B1 | 10/2001 | Weaber et al. | |
| 6,586,035 B2 * | 7/2003 | Rosse | 426/594 |
| 6,764,293 B2 * | 7/2004 | Kashulines, et al. | 425/237 |
| 7,621,734 B2 * | 11/2009 | Pontzer et al. | 425/237 |
| 7,794,771 B2 * | 9/2010 | Kessler | 426/594 |
| 8,084,069 B2 * | 12/2011 | Pontzer et al. | 426/283 |
| 2010/0104687 A1 * | 4/2010 | Kaplan | 426/3 |

FOREIGN PATENT DOCUMENTS

| | | |
|---|---|---|
| EP | 0923875 | 6/1999 |
| FR | 2305937 | 10/1976 |
| FR | 2884392 | 10/2006 |
| GB | 1 527 240 | 12/1975 |
| GB | 1603145 | 11/1981 |
| GB | 2196228 | 4/1988 |
| GB | 2306289 | 5/1997 |
| NL | 7613842 | 6/1977 |
| WO | WO 94/19972 | 9/1994 |

OTHER PUBLICATIONS

Beckett, S. T. 1994. Industrial Chocolate Manufacture and Use, $2^{nd}$ edition. Blackie Academic & Professional. New York. p. 80.*

* cited by examiner

*Primary Examiner* — Carolyn Paden
(74) *Attorney, Agent, or Firm* — Hoxie & Associates LLC

(57) ABSTRACT

Process for producing a chocolate or chocolate-like product comprising mixing together components of chocolate or chocolate-like product to give a flowable powder mixture, and feeding the flowable powder mixture to a roller compactor whereby the powder mixture is compressed to give the chocolate or chocolate-like product. The process can produce a chocolate or chocolate-like product comprising a compressed mass of particles of chocolate components.

13 Claims, 6 Drawing Sheets

PROCESS AND PRODUCT

CROSS REFERENCE TO RELATED APPLICATIONS

This application is a United States National Stage Application under 35 USC §371 of PCT/IB2008/003698, filed Nov. 27, 2008, which claims the benefit of GB Application No. 0723255.6, filed Nov. 28, 2007 the contents of each of which are incorporated herein by reference.

BACKGROUND OF THE INVENTION

This invention relates to a process for producing a chocolate or chocolate-like product and to a chocolate or chocolate-like product thereby produced.

Many processes are known for producing chocolate and chocolate-like products. Processes for producing chocolate and chocolate-like products typically involve dispersing finely ground powders in a fat phase. The finely ground powders may include, for example, cocoa solids, sugar and optionally milk solids. The ingredients that are used are dictated by the nature of the product. Plain chocolate contains cocoa solids but generally does not contain non-fat milk solids, whereas milk chocolate does contain non-fat milk solids and milk fat as additional ingredients. White chocolate is prepared without the addition of cocoa mass or cocoa powder. The fat used to produce the chocolate is typically cocoa butter.

In the traditional method for producing chocolate and chocolate-like products, the ingredients are mixed and ground in a refiner or mill to reduce the particle size of the solids. The resulting paste is then conched. Conching is a flavour-developing step which involves the intimate mixing or kneading of the chocolate ingredients and is traditionally carried out at elevated temperatures. During conching, the flavour of the product develops and the desired viscosity is obtained. Typically, the free acid and water content of the chocolate are reduced during conching. Conching is a time-consuming and energy intensive step in the process and typically takes from a few hours to a few days, depending on the product and the equipment used. After conching, the product is typically liquefied and tempered.

U.S. Pat. No. 6,270,826 B1 and US 2001/0028909 A1 both disclose a method and apparatus for making a shaped confectionery product of Bingham plastic rheology by cold extrusion wherein particles of the confectionery product are fed between counter-rotating form rolls having depressions corresponding to the desired product shape. In U.S. Pat. No. 6,270,826 B1 and US 2001/0028909 A1, a Bingham plastic material is defined as having a graph of shear stress spotted against shear rate which shows a linear relationship with a positive offset corresponding to the characteristic yield value of the material. Chocolate is stated as being a Bingham plastic material. Both U.S. Pat. No. 6,270,826 B1 and US 2001/0028909 A1 disclose the use of flakes, shavings or granules of previously prepared highly crystalline tempered chocolate to produce shaped products by the use of counter rotating rollers.

There remains a need for processes for making chocolate and chocolate-like products that can reduce the time and steps needed for their production. There is also a need for processes that can be operated more economically. In particular, there is a need for processes that can be used to make low fat chocolate and chocolate-like products.

SUMMARY OF THE INVENTION

According to the invention, there is provided a process for producing a chocolate or chocolate-like product comprising mixing together components of chocolate or chocolate-like product to give a flowable powder mixture, and feeding the flowable powder mixture to a roller compactor whereby the powder mixture is compressed to give the chocolate or chocolate-like product.

Preferably, the components are selected from the group consisting of cocoa solids, milk powder, sugars, sugar substitutes, cocoa butter, fats, cocoa liquor and mixtures thereof.

Conveniently, the cocoa solids are selected from cocoa powders, expeller flake and mixtures thereof.

Advantageously, the milk powders are selected from skimmed milk powder, whey powder, derivatives of whey powder, full cream milk powder and mixtures thereof.

Preferably, the sugars are selected from the group consisting of sucrose, fructose, glucose, dextrose and mixtures thereof.

Conveniently, the fat is selected from the group consisting of cocoa butter, cocoa butter equivalents, butter fat or fractions thereof, palm oil or fractions thereof, coconut or fractions thereof, palm kernel oil or fractions thereof, interesterified mixtures of the above fats or fractions or hardened components thereof, or mixtures thereof.

Advantageously, the components are in solid form.

Preferably, the components to be mixed together have a particle size of about 150 μm or less, preferably about 100 μm or less, more preferably about 80 μm or less, and most preferably about 20 μm or less.

Conveniently, the components comprise a sugar and wherein the sugar is ground before being mixed with other components.

Advantageously, cocoa powder, milk powder and sugar are ground before being mixed with other components.

Preferably, cocoa butter and cocoa liquor are used together in a crystalline form.

Conveniently, cooling is performed before, during and/or after the mixing step, most preferably during the mixing step.

Advantageously, the flowable powder mixture that is fed to the roller compactor is at a temperature below room temperature, preferably from about 10° C. to about 20° C., more preferably from about 14° C. to about 16° C.

Preferably, the roller compactor comprises a pair of counter rotating rollers having indentations on their surface.

Conveniently, the roller compactor comprises a pair of counter rotating rollers having no indentations on their surface.

Advantageously, the density of the powder mixture before compression is from about 0.6 to 0.9 mg/ml, preferably from about 0.7 to 0.8 mg/ml.

Conveniently, the density of the chocolate or chocolate-like product after compression is from about 1.15 to 1.55 g/ml, preferably from about 1.35 to 1.45 g/ml.

Preferably, the roller compactor is cooled during the compression step.

Conveniently, the process further comprises the step of processing the chocolate or chocolate-like product to produce flakes, granules and/or powder.

Advantageously, at least one component is ground before the mixing step.

Preferably, the grinding is carried out using an air classifier mill or a sugar mill.

Advantageously, the chocolate or chocolate-like product comprises fat in an amount of from about 5 to about 45% by weight, preferably from about 18 to about 25% by weight.

Conveniently, the powder mixture is not a Bingham plastic material.

Advantageously, the process does not involve liquefying the mixture of chocolate components.

According to another aspect of the invention, there is provided a chocolate or chocolate-like product obtainable by a process according to the invention.

According to a further aspect of the invention, there is provided a chocolate or chocolate-like product comprising a compressed mass of particles of chocolate components.

Preferably, the chocolate components comprise cocoa powder, cocoa butter and sugar.

Conveniently, the chocolate components further comprise milk powder.

Advantageously, the chocolate components comprise cocoa butter, sugar and milk powder.

Preferably, the chocolate or chocolate-like product does not comprise solid particles of chocolate components embedded in a substantially continuous fat phase.

Conveniently, the chocolate or chocolate-like product comprises solid particles of chocolate components and a substantially discontinuous fat phase.

Advantageously, the particles have a size of about 150 µm or less, preferably about 100 µm or less, more preferably about 20 µm or less.

BRIEF DESCRIPTION OF THE DRAWINGS

The present invention will now be described, by way of example, with reference to the accompany figures in which.

DETAILED DESCRIPTION OF THE INVENTION

Figure 1:
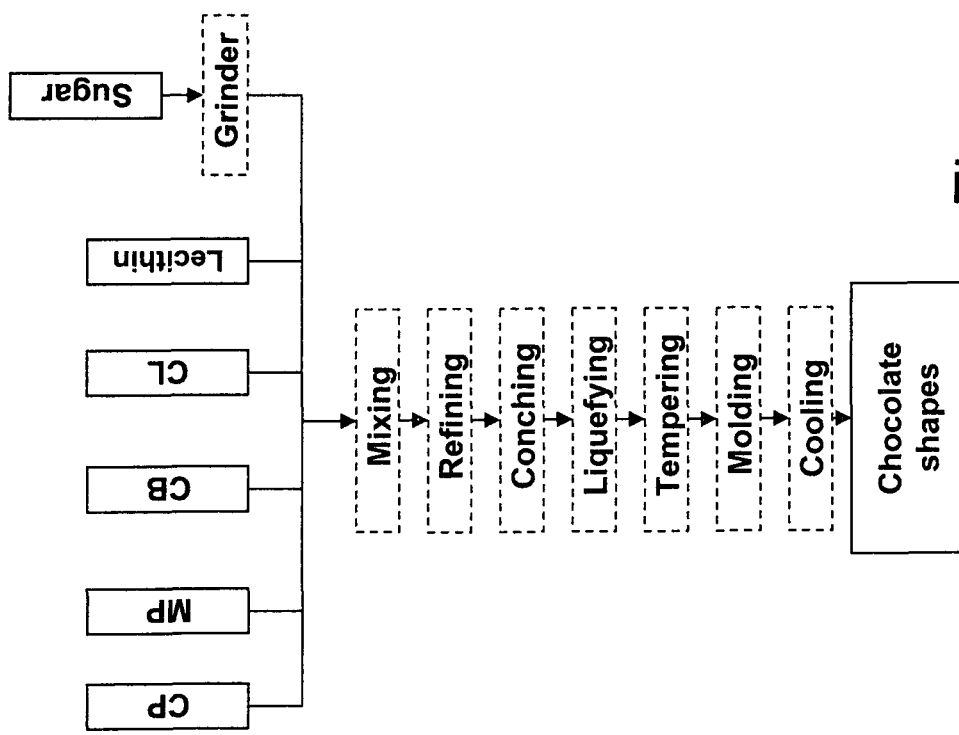
FIG. 1 is a flow-chart illustrating a typical prior art process for the production of chocolate shapes.

The process of the invention makes it possible to produce chocolate or chocolate-like products at a lower fat content than the minimum fat content needed in traditional production. Above that it has the advantage of avoiding the need for a conching step, a tempering step, a moulding step and/or a cooling step.

The process may involve the dry grinding of at least one solid component of chocolate comprising at least part of the components of the chocolate or chocolate-like product. By "at least part of the components", it is meant that all or not all of the components of the final chocolate product may be present i.e., not all of the components of the final chocolate or chocolate-like product may have been included and/or the components may not have been added in the amounts present in the final product.

Typically, the components include cocoa solids, sugars, sugar substitutes, milk powders, cocoa butter, fat and mixtures thereof. Preferably, the cocoa solids are selected from cocoa powders, expeller flake and mixtures thereof. Milk powders include, for example, skimmed milk powder, whey powder and derivatives thereof, full cream milk powder and mixtures thereof. Suitable sugars include sucrose, fructose, glucose and dextrose and mixtures thereof. Sugar substitutes preferably include inulin, dextrin, isomaltulose, polydextrose and maltitol and mixtures thereof. Preferably, the at least one component that is subjected to dry grinding is sugar.

Cocoa powder, cocoa butter and sugar are used for producing dark chocolate. Cocoa powder, cocoa butter, milk powder and sugar are used to produce milk chocolate. Milk powder, cocoa butter and sugar are used to produce white chocolate. Preferably, the free flowing powder mixture that is formed in the process of the invention comprises the components of dark, milk, or white chocolate. The process of the invention can also be used with a flowable powder mixture of sugar and cocoa butter.

Preferably, dry grinding is carried out using a classifier mill, more preferably an air classifier mill. More preferably, the air classifier mill is a radial classifier having an air purge system. Air classifier mills that can be used in the invention are commercially available. Suitable apparatus is available from, for example, P.M. Duyvis Machinefabriek BV, The Netherlands. The term dry is not intended to signify the complete absence of water but to indicate that the grinding is performed on a powder in the absence of a liquid medium, typically in the absence of liquid fat. During grinding, the particle size of the solids present in the mixture is reduced. Advantageously, the mixture is ground such that it comprises solids having a mean particle size of less than about 150 µm, preferably less than about 100 µm, more preferably less than about 80 µm and most preferably less than about 20 µm.

Preferably, the fat is selected from the group consisting of cocoa butter, cocoa butter equivalents, butter fat or fractions thereof, palm oil or fractions thereof, coconut or fractions thereof, palm kernel oil or fractions thereof, interesterified mixtures of the above fats or fractions or hardened components thereof, or mixtures of one or more of the fats or oils mentioned. The chocolate or chocolate-like products preferably comprise cocoa butter. The process of the invention may be used for the production of chocolate-like products that comprise fat other than or in addition to cocoa butter.

Cocoa liquor or cocoa mass may be used to incorporate at least part of the cocoa butter and cocoa solids together.

Preferably, one or more components selected from emulsifiers and flavouring agents are added during the mixing of the components.

The emulsifiers that are preferably added are selected from the group consisting of lecithin, fractionated lecithin, ammonium phosphatide and PGPR or mixtures thereof. Flavouring agents that may be added are preferably selected from the group consisting of vanilla and caramel or mixtures thereof.

The milk powder used in the invention may comprise full cream milk powder, processed or partially-processed milk powder such as skimmed milk powder, whey powder and derivatives thereof, milk protein concentrate, lactose, modified milk powder and mixtures thereof demineralised milk powder is preferred.

The invention also provides chocolate and chocolate-like products made according to the process of the invention. For chocolate, the fat content can be the minimum as allowed by legislation (e.g. in the EU the minimum amount of fat in dark chocolate is 18%, and for milk chocolate is 25%). Chocolate-like products, may have a fat content of at least 5% by weight, preferably at least 18%. The process of the invention is particularly suitable for the production of chocolate and chocolate-like products having a low fat content.

The products may have a fat content of less than 45% by weight, preferably less than 25%. The products preferably have a fat content of from 5 to 45% by weight, more preferably 18 to 25% by weight.

A preferred milk chocolate or chocolate-like product according to the invention comprises:
about 20% by weight cocoa butter
about 5% by weight cocoa solids
about 15% by weight milk powder
about 59.5% by weight sugar
about 0.5% by weight lecithin A preferred dark chocolate or chocolate-like product according to the invention comprises:
about 15% by weight cocoa butter
about 25% by weight cocoa mass or cocoa liquor
about 59.5% by weight sugar
about 0.5% by weight lecithin A preferred white chocolate or chocolate-like produce according to the invention comprises:
about 20% by weight cocoa butter
about 15% by weight milk powder
about 64.5% by weight sugar
about 0.5% by weight lecithin The percentages of the components, together with any other components present, will add up to 100%.

It will be appreciated that the fat may be a mixture of different fats and that the term "fat" refers to the fats that are typically included in chocolate products.

The sugar preferably comprises sucrose. The total sugar content may be derived from, for example, sugar mixed with the other components and from any sugar present in the other components e.g. any cocoa based materials.

The chocolate or chocolate-like product preferably comprises milk solids. The total milk solids may be derived, for example, for any added milk solids and from any milk solids present in the other components e.g., cocoa based materials, such as chocolate powder. Preferably, the chocolate or chocolate-like product comprises from 1 to 40% by weight total milk solids, more preferably from 10 to 30% by weight total milk solids, such as from 18 to 28% by weight total milk solids. The milk solids content will be lower, typically from 1 to 5% by weight, when the chocolate or fat-containing chocolate equivalent is a dark chocolate and higher, typically from 5 to 20% by weight, when the chocolate or fat-containing chocolate equivalent is a white chocolate. The added milk solids are typically selected from skimmed milk powder, whey powder and derivatives thereof, full cream milk powder and mixtures thereof.

In a particularly preferred embodiment, the chocolate or chocolate-like product comprises from 1 to 25% by weight (more preferably from 8 to 18% by weight) full cream milk powder and from 1 to 15% (more preferably from 3 to 13% by weight) of skimmed milk powder.

Preferably, the water content of the chocolate or chocolate-like is from 0.5 to 1.5% by weight.

Preferably, the chocolate or chocolate-like product comprises an emulsifier. For example, emulsifiers are generally present in the chocolate or chocolate-like product in amounts of up to 1% by weight, more preferably up to 0.7% by weight or up to 0.2% by weight, based on the weight of the chocolate or chocolate-like product respectively.

Emulsifiers include lecithin derived from soya bean, safflower, corn; fractionated lecithins enriched with either phosphatidyl choline, phosphatidyl ethanolamine, phosphatidyl inositol; emulsifiers derived from oats, mono- and diglycerides and their tartaric esters, monosodium phosphate derivatives of mono- and diglycerides of edible fats and oils, sorbitan monostearate, sorbitan tristearate, sucrose esters, polyoxyethylene sorbitan monostearate, hydroxylated lecithin, synthetic phospholipids such as ammonium phosphatides, lactylated fatty acid esters of glycerol and propylene glycol, polyglycerol esters of fatty acids, propylene glycol mono- and diesters of fats and fatty acids. It is preferred to use at least one of fractionated lecithin, polyglycerol polyricinoleate (PGPR), polyglycerol ester, sorbitan tristearate and mixtures thereof.

The chocolate or chocolate-like products optionally comprise one or more flavourings. Suitable flavourings include, but are not limited to, fruit, nut, and vanilla flavourings, fruit powder, vanilla, herb flavourings, caramel and caramel flavourings. Those skilled in the art are familiar with numerous flavourings that can be selected for use in this invention.

A Bingham plastic is a viscoelastic material that behaves like a rigid body at low stresses but flows as a viscous fluid at high stress. Once a critical shear stress or yield stress is exceeded, the material flows as a Newtonian fluid with a linear relationship between shear stress and shear rate. Examples of Bingham plastic materials include particulate dispersions such as slurries, muds, pastes, liquid cement and chocolate prepared using the traditional liquid stages of, for example, conching and tempering.

As mentioned above, chocolate prepared using the traditional liquid stages of, for example, conching and tempering, is a Bingham plastic material. However, the individual components of chocolate do not, in general, behave as Bingham plastic materials themselves. For example, cocoa powder, sugar and milk powder are not Bingham plastic materials. Also, the flowable powder mixture of components according to the present invention is not a Bingham plastic material.

According to literature, the flow properties of certain materials, such as molten chocolate, can be modelled by the equation set out below (J. Chavalley, "An adaption of the Casson equation for the rheology of chocolate", Journal of Texture Studies, 22 (1991) 219-229; R. Alex Speers et al, "Yield stresses in molten chocolates", Journal of Texture Studies, 24 (1993) 269-286);

$$\sigma^m = A\,D^m + B,$$

where σ is shear stress, D is shear rate, plastic viscosity (PV) is $A^{1/m}$, and yield value (YV) is $B^{1/m}$.

Bingham materials are modelled by this equation when m=1, giving a linear relationship between shear stress and shear rate.

Casson materials are modelled by this equation when m=0.5, giving a linear relationship between the square root of shear stress and the square root of shear rate.

According to the invention, the flowable powder mixture of components of chocolate or chocolate-like product behaves as a Casson material when compressed by a roller compactor, rather than a Bingham material.

The listing or discussion of an apparently prior-published document in this specification should not necessarily be taken as an acknowledgement that the document is part of the state of the art or is common general knowledge.

The invention will now be described, by way of non-limiting example only, with reference to the accompanying drawings, which depict schematically processes according to the invention.

FIG. 1 shows a schematic illustration of a typical traditional process for preparing shaped chocolate products. Six components of chocolate are shown as starting materials. It is important to note that there may be other components present in relatively small amounts depending on the particular product to be made. The chocolate components include cocoa powder (CP), milk powder (MP), cocoa butter (CB), cocoa liquor (CL), lecithin and sugar. Typically, the sugar starting material does not have a sufficiently small particle size for its direct use in the production of chocolate. It is therefore passed through a grinder to sufficiently reduce the particle size for use in the production of chocolate. The chocolate components are mixed together and refined. After the refining step the mixture undergoes conching. This process raises the temperature of the mixture and helps to develop the chocolate flavour.

After conching the mixture is liquefied and then undergoes a tempering process. Tempering involves the controlled heating and cooling of the mixture to selectively cause the crystallisation of the cocoa butter in a preferred form (known as crystal form V).

After tempering, the mixture can then be poured into moulds followed by cooling to solidify the chocolate mass. Once sufficiently cooled, the shaped chocolate products may be removed for packaging or further processing steps.

The conching, liquefying, tempering, moulding and cooling steps are relatively time and energy intensive and place restrictions on the rate at which chocolate products can be made. Furthermore, the relative amounts of the chocolate components have profound effects on the properties of the mixture during its transformation into the final chocolate product. For example, the level of cocoa butter or other fats in the mixture affect the viscosity during the liquid steps. A relatively large amount of cocoa butter reduces the viscosity of such a liquid mixture, whereas a low level of cocoa butter can increase the viscosity to such high levels that technical problems are encountered. In particular, it can be difficult to handle a molten chocolate mixture having a low fat content because its high viscosity can cause problems with pumping.

Figure 2:
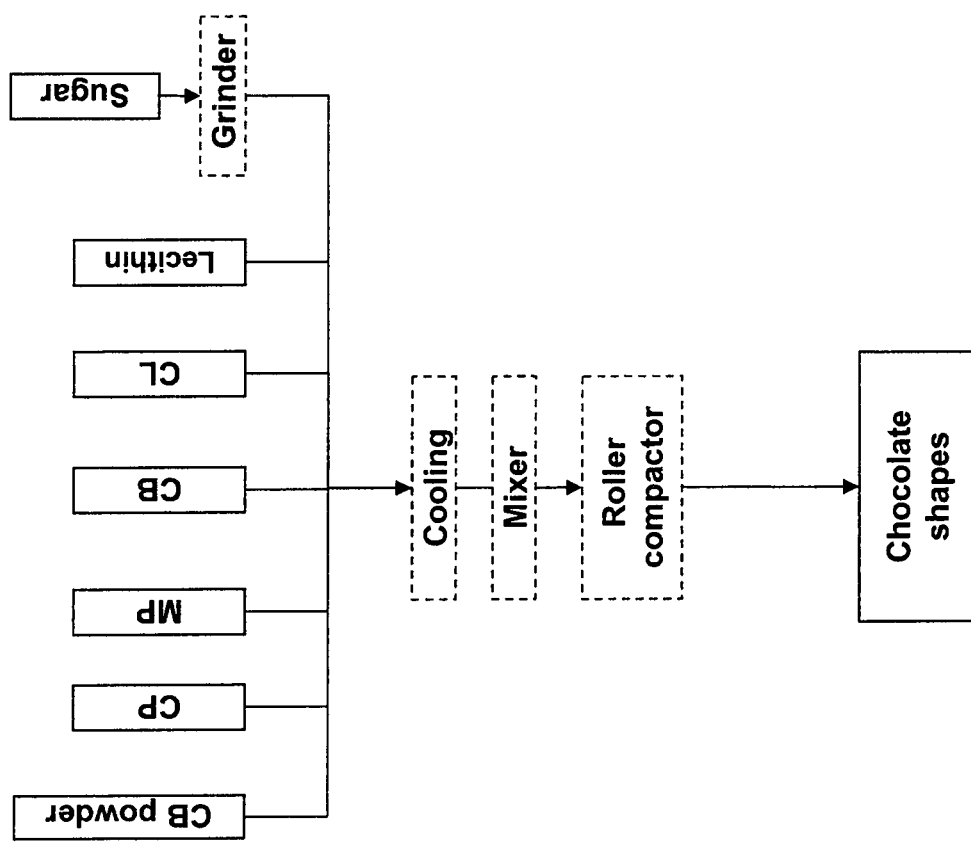
FIG. 2 is a flow-chart illustrating one embodiment of a method for producing a chocolate or chocolate-like shaped product in accordance with the invention.

FIG. 2 shows one embodiment of a process for producing chocolate or chocolate-like shaped products according to the invention. In the embodiment shown a number of chocolate components are used as ingredients. These can include cocoa butter powder (CB powder) which can be formed by spray crystallising cocoa butter to give a free flowing powdered starting material. Cocoa butter powder can be prepared by cooling an atomised spray of liquid cocoa butter droplets with a cryogenic fluid, as described in EP 0 393 963, which is incorporated herein by reference. Cocoa butter powder is commercially available from Barry Callebaut under the product name MYCRYO®.

Other components include cocoa powder (CP), milk powder (MP), cocoa butter (CB), cocoa liquor (CL), lecithin and sugar. Again, the sugar requires grinding in order to give a particle size suitable for use in the process. The chocolate components are cooled and mixed together to give an intimate mixture of the different chocolate components. In other words, the different chocolate components are intimately mixed together to give a powder or powder-like mixture containing substantially discrete particles of the solid components. This mix is different from traditional chocolate because the solid particles of the chocolate components are not embedded in a substantially continuous fat phase, as would be the case in traditionally prepared chocolate. In other words, the mixture comprises the components of chocolate mixed together but without having the physical structure of chocolate itself. Mixing is performed under conditions which retain the components of the material as substantially separate and discrete particles. In other words, the components are not liquefied during the mixing process.

The mixture is preferably cooled during the mixing step. A convenient method of cooling is the addition of a sufficient amount or amounts of liquid nitrogen to keep the temperature of the mixture within a desired temperature range, such as below room temperature (e.g. 25° C.), at about 10° C. to about 20° C., more preferably from about 10° C. to about 16° C.

After mixing, the mixture may be fed to a roller compactor. The roller compactor compresses the powdered mixture to give shaped chocolate or chocolate-like products. Rollers compactors have been used in the pharmaceutical and food industries to produce shaped products under certain circumstances. For example, U.S. Pat. No. 5,358,727, U.S. Pat. No. 6,270,826 and US 2001/0028909 disclose roller compactors for use with food products. They generally comprise a pair of counter-rotating drums having indentations on one or both of the drum surfaces. Material is typically fed by gravity between the counter-rotating rollers which forces material into the indentations which is then compressed as the rolls rotate together. It has been found advantageous to leave a relatively small gap or nip between the counter-rotating rolls to prevent excessive wear and tear on the surface of the rolls and to allow the formation of shaped products which are held together by a thin web of material. This allows for easy removal of the shaped products from the counter-rotating rolls in a continuous sheet. The thin web of material may be removed from the shaped products by conventional means, such as tumbling. The counter-rotating rolls may optionally be cooled during the compaction process.

The indentations on the rolls may have any shape which allows for the formation and removal of a shaped product, such as square, rectangular, spherical or lentil shapes. The shapes may have any suitable size and shape and may for example be in the order of about 3 cm by 3 cm, more preferably about 1 cm by 1 cm or most preferably about 0.5 cm by 0.5 cm.

The roller compactor may comprise rolls without indentations on their surfaces. In this case, the flowable powder material fed into the roller compactor would be compressed to give a sheet or web of chocolate or chocolate-like material. The sheet of material may then be processed, if desired, to give other products. For example, the sheet may be broken up or ground to give flakes or granules.

The flowable powder mixture is preferably cooled before being compressed, which aids in the formation and release of the product from the roller compactor. In a preferred embodiment, the powder mixture has a temperature below ambient or room temperature (about 25° C.) when it is fed into the roller compactor. For example, the powder mixture may have a temperature below about 20° C., preferably from about 10° C. to about 20° C., more preferably from about 12° C. to about 18° C., most preferably from about 14° C. to about 16° C.

The process according to the invention does not require the traditional steps of conching, liquefying, tempering, moulding and cooling in order to produce shaped products. This saves substantial amounts of energy during the manufacturing process and also time and space at the manufacturing site. The process simplifies the preparation and handling of the components and the resulting product and can increase throughput. By utilising a powder mixture, it is possible to lower the fat content without causing handling problems that may arise with a liquefied mixture at this fat content.

Figure 3:
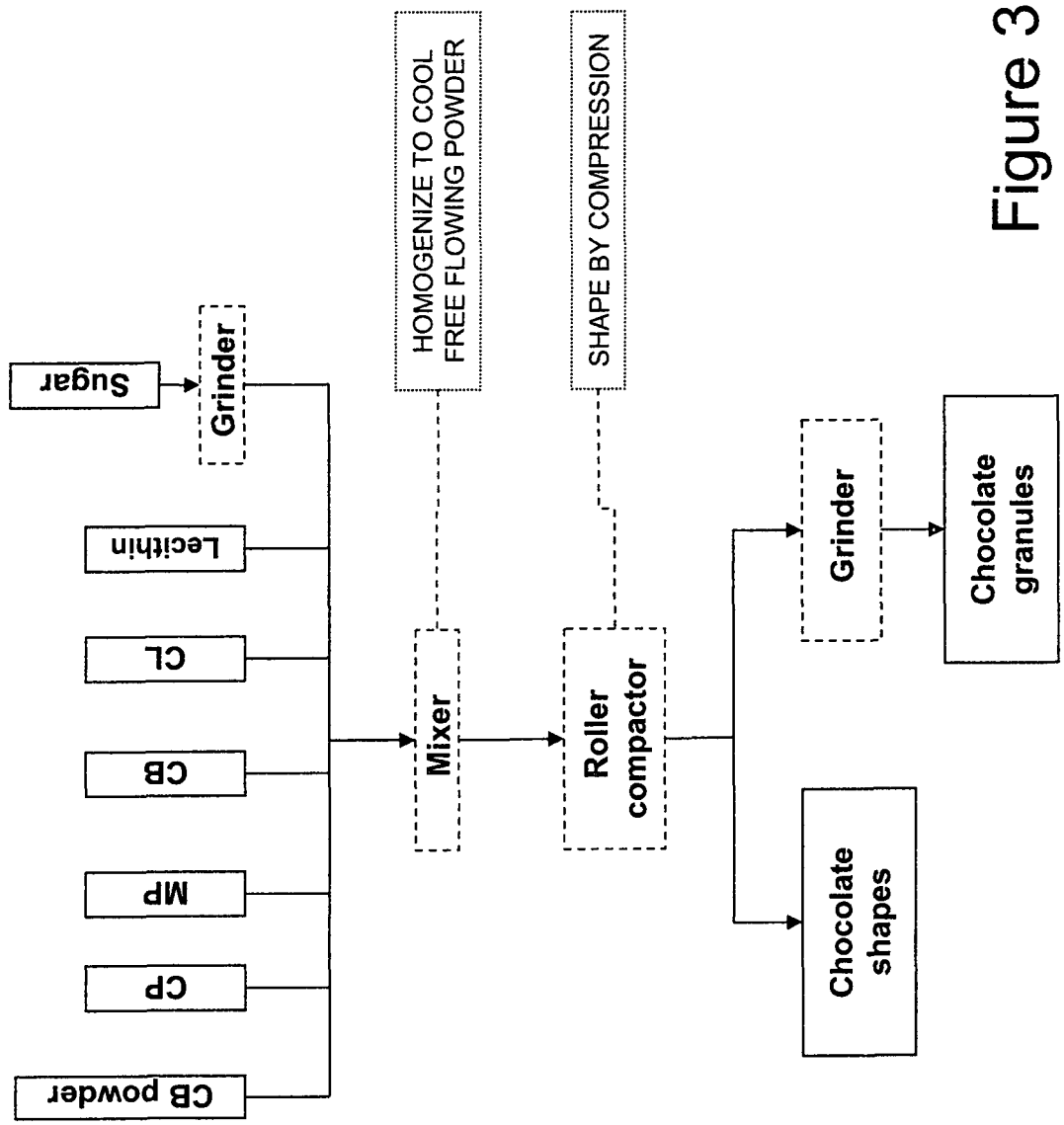
FIG. 3 is a flow-chart illustrating a further embodiment of a process for producing a chocolate or chocolate-like shaped product in accordance with the invention.

FIG. 3 shows an embodiment where the solid chocolate components have a particle size of around 150 μm or less. The particle size distribution may be measured in a manner well known in the food industry, such as sieve analysis or laser diffraction methods. The preferred method of determining particle size uses a micrometer, as described below with reference to the examples. The starting components can include cocoa butter powder (CB powder), cocoa powder (CP), milk powder (MP), cocoa butter (CB), cocoa liquor (CL), lecithin and sugar. In general, the sugar requires grinding to bring its particle size down to around 150 μm or less. Typically, the other components do not require further processing in order to reach this particle size requirement.

Again, the chocolate components are mixed together, optionally under cooling, to produce a free flowing powder. The cooling may be performed if necessary to prevent melting of the chocolate components during the mixing procedure. The resulting free flowing powder comprising a mixture of the chocolate components may then be passed to a roller compactor. The roller compactor then shapes the powder by compression to give shaped chocolate or chocolate-like products. As well as producing shaped products which may be packaged or further processed whilst substantially retain their shape, the resulting products may also be processed by grinding to give chocolate or chocolate-like granules for other uses. The granules preferably have sizes of from 4 to 9 mm more preferably 3 to 5.4 mm, most preferably 1.9 to 4 mm, corresponding to different sieve sizes.

In general, the smoothness of the mouthfeel of chocolate or chocolate-like products may be improved by reducing the particle size of the chocolate components. A particle size of around 150 μm or less is suitable for many applications, for example in baking or cooking where the chocolate may be eaten along with other foodstuffs which do not have a smooth mouthfeel. For example, this may include the use of chocolate or chocolate-like chips in cookies. When chocolate is to be eaten on its own, it may be beneficial to reduce the particle size further in order to improve the smooth mouthfeel. Thus, particles having a size of around 100 μm or less are suitable for this use.

Figure 4:
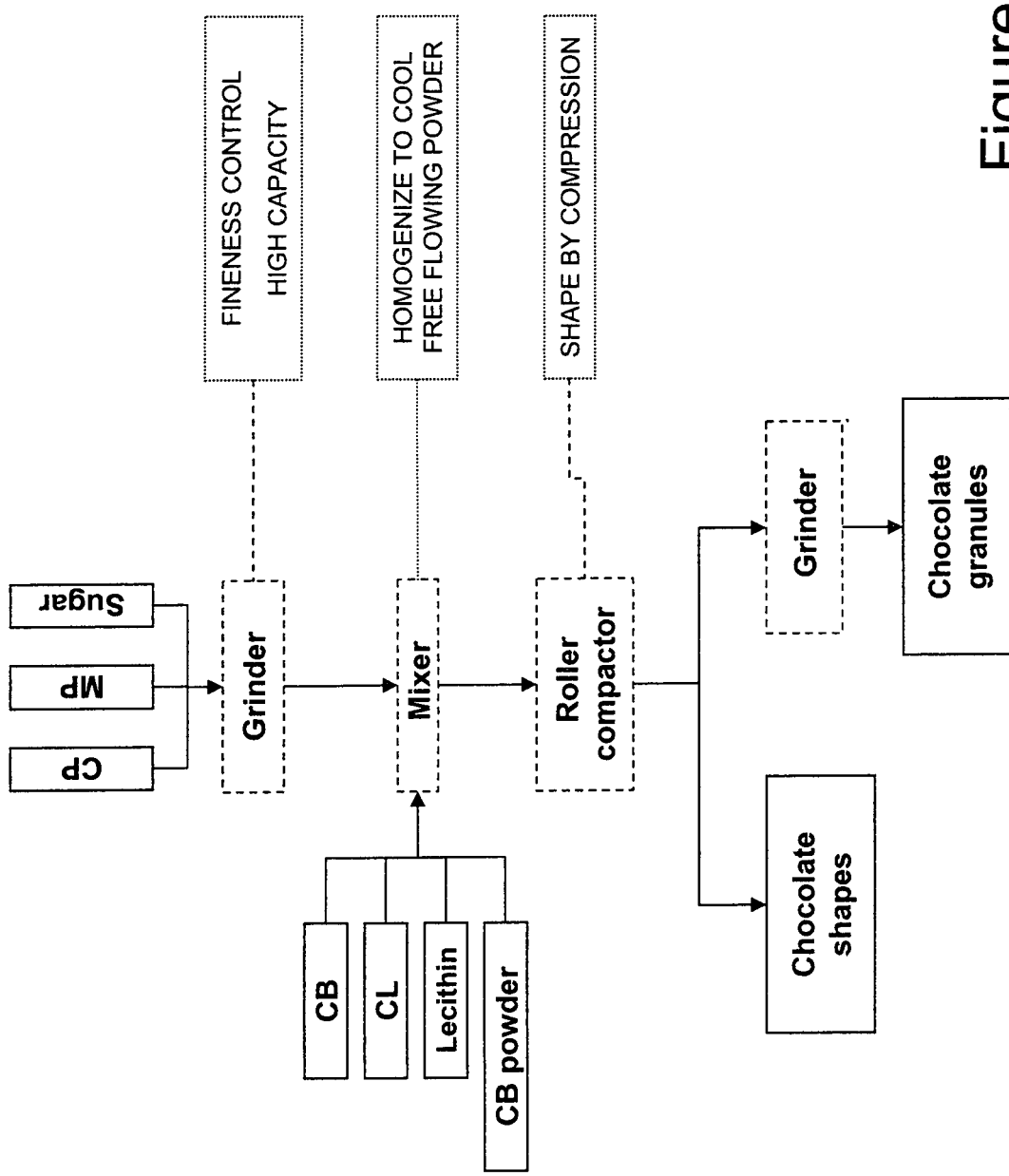
FIG. 4 is a flow-chart illustrating another embodiment of a method for producing a chocolate or chocolate-like shaped product in accordance with the invention.

FIG. 4 shows another method according to the invention utilising chocolate components having a particle size of around 100 μm or less. As shown, cocoa powder (CP), milk powder (MP) and sugar are ground to reduce their particle size to the required 100 μm or less particle size. Cocoa butter (CB), cocoa liquor (CL), lecithin and cocoa butter powder (CB powder) may be obtained in a form which is suitable for use in this embodiment without further grinding. The components are mixed together, again with cooling if necessary, to give a free flowing powder containing the intimately mixed chocolate components. The resulting mixture is then passed to a roller compactor which forms chocolate or chocolate-like products by compression, as discussed above. Again, the shaped products may be used per se or may be converted to chocolate granules, flakes or powder for other uses.

Figure 5:
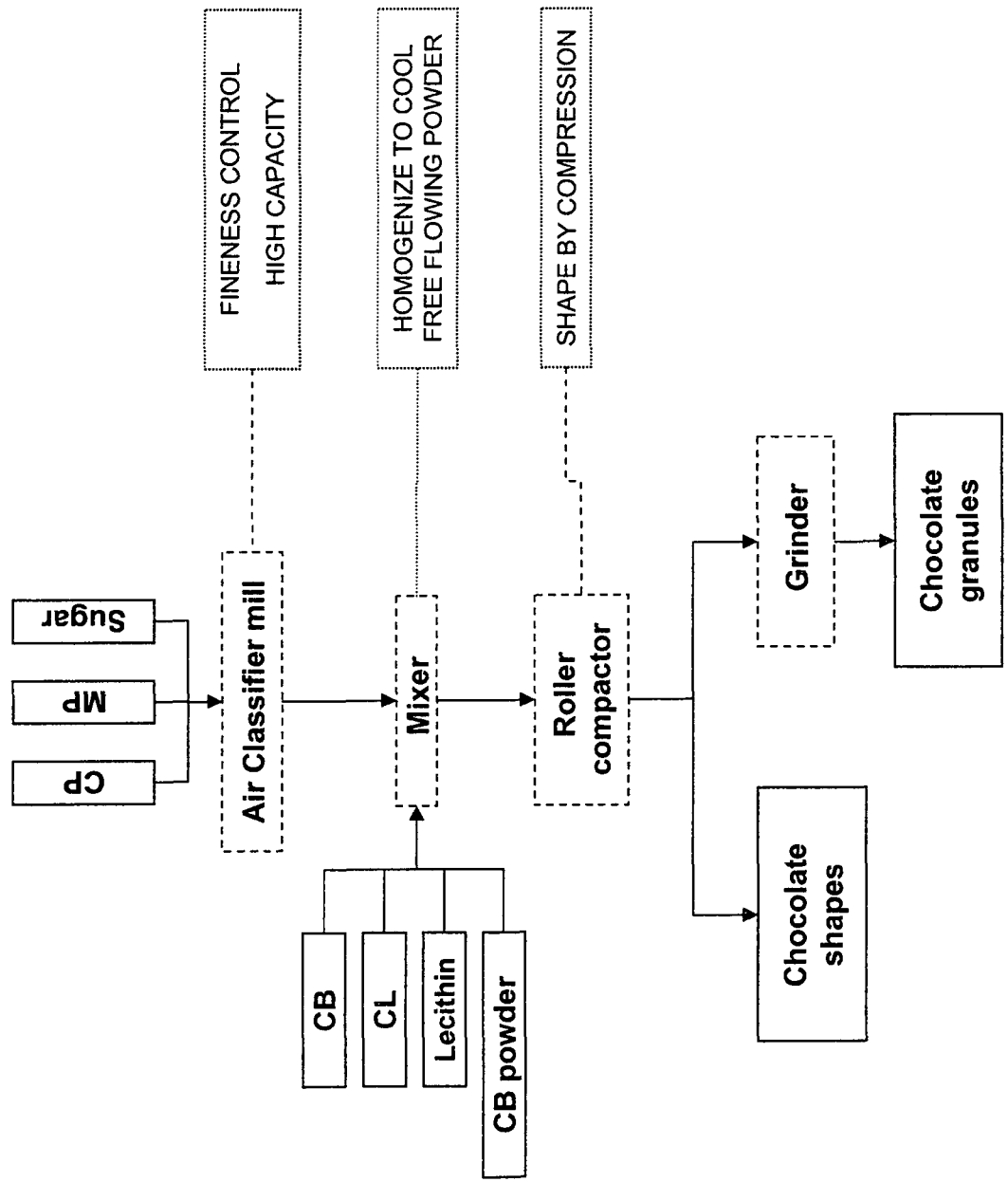
FIG. 5 is a flow-chart illustrating a further embodiment of a method for producing a chocolate or chocolate-like product in accordance with the invention.

FIG. 5 shows a further embodiment where the chocolate components used have a particle size of around 20 μm or less. This particularly small particle size is useful for producing high quality products for direct eating. In the embodiment shown, cocoa powder (CP), milk powder (MP) and sugar are ground using an air classifier mill to give a particle size of around 20 μm or less. Again, cocoa butter (CB), cocoa liquor (CL), lecithin and cocoa butter powder (CB powder) may be used in a form which does not require further processing in order to meet the 20 μm or less particle size requirement. The resulting intimate mixture of the chocolate components is then passed to a roller compactor. Again, this gives chocolate or chocolate-like shaped products which may be used per se or may undergo further processing, such as grinding, for use in other applications.

It is clear that other particle sizes may be used in accordance with the present invention. For example, a particle size of around 80 μm or less may be used, depending on the intended use of the final product.

The term "chocolate or chocolate-like product" is meant to refer to the product resulting from the method of the invention. The term "chocolate" has a variety of legal definitions, which vary from country to country. For example, a product that may be described as chocolate in one country may not fall within the legal definition of chocolate in another country. In particular, the term "chocolate-like product" may be used to refer to a product which contains fat other than cocoa butter. Thus, a chocolate-like product may contain vegetable fat, such as a lauric fat, in addition to cocoa butter.

The term "flowable powder mixture" is meant to refer to a mixture of components of chocolate in powder or particulate form, which may flow. For example, a flowable powder mixture may flow through a funnel or hopper into another container under the influence of gravity. In the present invention, a flowable powder mixture is suitable for use with a roller compactor as it would be able to flow into the nip between the rolls and into any indentations on the surfaces of the rolls. The term "flowable" is well known in the food industry and has a clear meaning to the person killed in the art.

A "flowable powder mixture" has several advantages in use, particularly on an industrial scale. The powder mixture may be handled, stored and transported relatively easily and energy-efficiently, as compared with, for example, solid materials that are not flowable. This advantage is particularly important in combination with the ability to avoid a liquefying step in the process, which involves the use of energy to melt solid materials, and also to cool the liquid materials.

The intimate mixture of chocolate components used in the method of the present invention is distinct from a Bingham plastic material. As explained above, the mixture used in the present invention contains discrete chocolate components. As such, it is not equivalent to a powder or granules formed by grinding a traditionally formed chocolate product. The physical properties of the mixture of chocolate components of the present invention are different from a powder or granules of traditionally formed chocolate.

The following non-limiting examples illustrate the invention and do not limit its scope in any way. In the examples and throughout this specification, all percentages, parts and ratios are by weight unless indicated otherwise.

Procedure for Measuring Particle Size Using a Micrometer

1. Principle

A small amount of (diluted) product is placed on the measuring surface of a micrometer. By pressing, an indication of the size of the largest non-compressible particles can be measured.

2. Material

Micrometer: precision 1 μm.
Solution A: 50% lecithin with 50% sunflower oil at about 20° C.

3. Sample Preparation fill about 10 gram of the product into a cup
add about 2 ml of the solution A to the cup with a plastic syringe
stir thoroughly with a spatula to an homogenous liquid emulsion 4. Procedure Verification
Make sure the surfaces of the micrometer are clean (otherwise clean with paper).
Slowly rotate the micrometer screw until both surfaces are closed.
Verify that the instrument reads zero when closed.

Measurement
Add one or two drops of the prepared sample emulsion onto the fixed micrometer surface.
Slowly rotate the micrometer screw until the ratchet clicks twice.
Take the reading from the micrometer.

Clean the surfaces and repeat the measurement procedure three times.

Make an average of the three readings and express the result in μm.

Procedure for Density Measurement

Density of Shaped Products

In a pycnometer, the volume of the product is determined by the displacement of a liquid. A ground-glass stoppered 25.00 mL Erlenmeyer flask is used, with water as the working liquid.

Four measurements are made:

mp=mass of product
mf=mass of dry empty flask
mfw=mass of flask filled with water
mfwp=mass of flask filled with product and water From these measured masses, the density of the product can be calculated in a known manner as follows (taking the density of water to be 1 g/ml):

$$\text{Density (g/ml)} = mp/(mfw-mf)-(mfwp-mf-mp)$$

Density of Powders

The density of the flowable powder mixture may be measured by pouring a quantity of the flowable powder mixture into a container and then measuring the volume and mass of the sample. The poured bulk density of the flowable powder mixture may then be calculated by dividing the mass by the volume. A preferred method of determining the poured bulk density of the flowable powder mixtures of the invention involves pouring a quantity of the mixture into a 250 mL graduated cylinder using a funnel, determining the mass and volume of powder in the cylinder, and then dividing the mass by the volume.

EXAMPLES

Example 1

A pillow shaped chocolate product was made according the invention, as depicted in FIG. 2, having the following composition:

| Shaped Chocolate Product with 18% fat | | |
|---|---|---|
| Composition | % | Particle fineness (μm) |
| Cocoa butter powder | 15 | 120 |
| Natural cocoa powder | 25 | 40 |
| Refined sugar | 60 | 140 |
| Total: | 100 | |

The crystalline sugar was first refined on a commercial available sugar mill (Bauermeister UT23) to a measured fineness of about 140 μm.

The mixer used was on a commercial available powder mixer with double jacket cooling with ice water, and also cooling in the stirring shaft (Ruberg batch mixer CM-ZG 100).

The natural cocoa powder and the refined sugar were dosed into the mixer and cooled to a temperature below about 15° C. Then the cocoa butter powder was dosed and gently mixed with the previous to homogenous powder mix at about 15° C. The powder mix had a poured bulk density of 0.6 g/ml.

The powder mixture was then fed to the roller compactor. This was a commercial available roller compactor (Bepex L200/50P) with a roll diameter of 200 mm and roll width of 50 mm, having half pillow shape indentations of 10×10×2.5 mm.

The rolls of the compactor were cooled to about 15° C. and ran at 10 RPM. The feeder speed at 15 RPM and a pressure of 15 kN on the rolls resulted in a output of 70 kg/hour.

The pillow shape chocolate coming out was 10×10×5 mm connected to each other by a thin product sheet. To remove the thin sheet between the pillows after compacting or briquetting, the product goes through a rotary sieve. The removed product can be recycled into the roller compactor; and the pillows could be further processed or used as such. The chocolate pillows had a density of 1.2 g/ml.

Example 2

A granular shaped chocolate product was made according the invention, as depicted in FIG. 3, having the following composition:

| Granular Chocolate with 18% fat | | |
|---|---|---|
| Composition | % | Particle fineness (μm) |
| Cocoa liquor | 30 | 50 |
| Natural cocoa powder | 10 | 40 |
| Refined sugar | 60 | 140 |
| Total: | 100 | |

The crystalline sugar was first refined on a commercial available sugar mill (Bauermeister UT23) to a measured fineness of about 140 μm.

The mixer used was on a commercial available powder mixer with double jacket cooling with ice water, and also cooling in the stirring shaft (Ruberg batch mixer CM-ZG 100).

The natural cocoa powder and the refiner sugar were dosed into the mixer and cooled to a temperature below about 15° C. Then the cocoa liquor was sprayed into the powder mix, using the spray nozzle, and the cutter knife and gently mixed with the previous to homogenous powder mix at about 15° C. The powder mix had a poured bulk density of 0.7 g/ml.

The powder mixture was then fed to the roller compactor. This was a commercial available roller compactor (Bepex L200/50P) with a roll diameter of 200 mm and roll width of 50 mm, having a rough surface without indentations.

The rolls of the compactor were cooled to about 15° C. and ran at 5 RPM. The feeder speed at 23 RPM and a pressure of 15 kN on the rolls resulted in a output of 100 kg/hour. After the compactor, a continuous sheet of compacted product is made of about 9 mm thickness.

This sheet was broken by a rotary grinder to granules. The granules were sieved in order to obtain fractions suitable for use for other commercial products. Overs and fines were recycled to the feeder hopper of the roller compactor. The appropriate sieve fraction could be further processed or used as such.

Example 3

Figure 6:
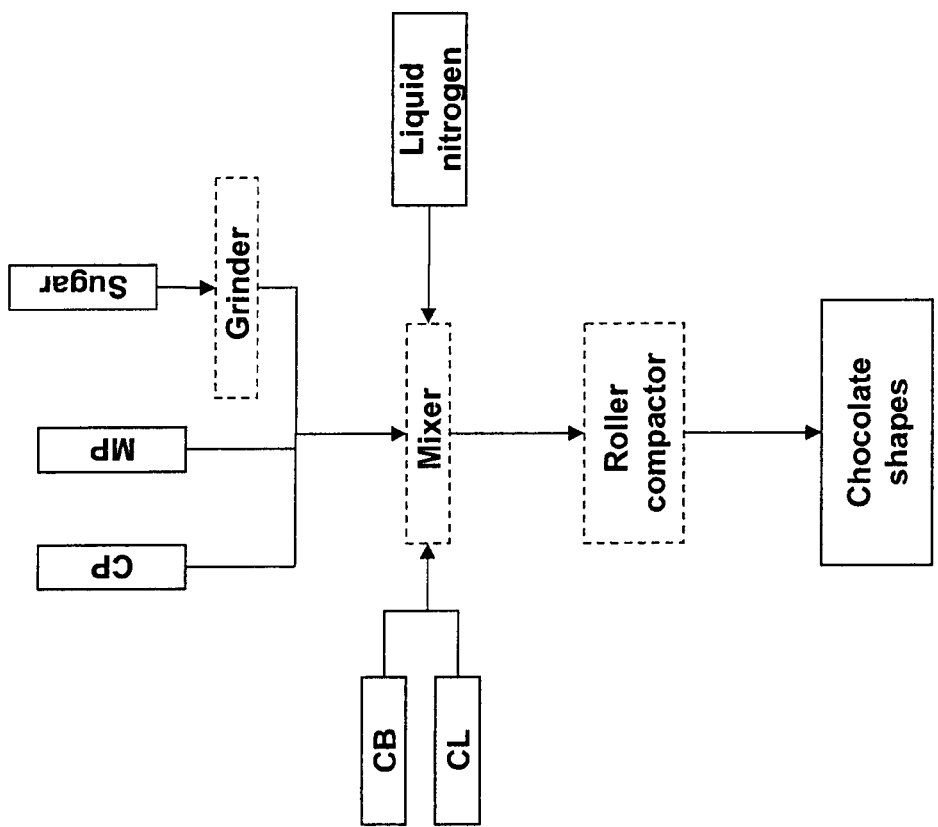
FIG. 6 is a flow-chart illustrating a yet further embodiment of producing a chocolate or chocolate-like product in accordance with the invention.

A pillow shaped chocolate product is made according the invention, as depicted in FIG. 6, having a composition as follows:

| Dark chocolate shapes with 20% fat | | |
|---|---|---|
| Composition | % | Particle fineness (μm) |
| Cocoa liquor | 35 | 50 |
| Natural cocoa powder | 8 | 40 |
| Refined sugar | 57 | 140 |
| Total: | 100 | |

The crystalline sugar is first refined on a commercial available sugar mill (Bauermeister UT23) to a measured fineness of about 140 μm.

The used mixer is a commercially available Amixon vertical twin-shaft mixer type HM400. The mixer contains 2 injection points for liquid additions. One injection point is modified to be able to inject liquid nitrogen into the mixer. Liquid nitrogen is provided in small containers.

First the solid raw materials (sugar and cocoa powder) are added in the mixer, with the main shafts speed at 50 RPM. Then the cocoa liquor is sprayed in the mixer through a liquid injection point close to a chopper, rotating at 3000 RPM. Simultaneously, liquid nitrogen is sprayed in the mixer. Dosing of cocoa liquor and liquid nitrogen are related to each other to keep the temperature during dosing around 25° C. After all cocoa liquor is added, the powder mix is further cooled with liquid nitrogen to 15° C.

The result is a mixture of sugar, cocoa powder and cocoa liquor in a free flowing powder form at about 20% of total fat. This powder mix has a poured bulk density of 0.7 g/ml. This cooled powder mix is then fed to a commercially available roller compactor (Fitzpatrick Chilsonator IR-520) with a roll diameter of 200 mm and roll width of 50 mm, having a rough surface with pillow shape indentations of 10 mm×10 mm×2.5 mm.

The rolls of the compactor are cooled to about 15° C. and run at 25 RPM. The minimal gap between the rolls is set to 0.5 mm. The feeding to the rolls is controlled by the horizontal feeder screw (speed between 55 and 65 RPM). The vertical screw is feeding the rolls and is responsible for the de-aeration of the powder before entering the rolls (speed is set to 250 RPM). The pressure on the rolls is set to 15 kN. These settings result in an output of 190 kg/hour.

The pillow shaped chocolate products coming out are 10×10×5 mm, partially connected to each other by a thin product sheet. To remove the brim of the pillows after compacting, the product is sent over a commercially available AZO cyclone screener type DA650. The waste product can be recycled into the roller compactor; and the pillow shaped chocolate can be further processed or used as such. The chocolate pillows have a density of about 1.15 g/ml.

The invention claimed is:

1. Process for producing a chocolate or chocolate-like product comprising mixing together components of chocolate or chocolate-like product to give a flowable powder mixture,
wherein the components are selected from the group consisting of cocoa solids, milk powder, sugars, sugar substitutes, cocoa butter, fats, cocoa liquor and mixtures thereof,
wherein the components to be mixed together have a particle size of 150 μm or less,
wherein the powder mixture is a non-Bingham plastic material, and feeding the flowable powder mixture to a roller compactor wherein the roller compactor comprises a pair of counter rotating rollers having indentations on their surface which compresses and shapes the powder mixture to give the shaped chocolate or chocolate like product, and wherein the shape of the chocolate or chocolate-like product corresponds to the shape of the indentations; wherein
(i) cooling is performed during the mixing step;
(ii) the flowable powder mixture that is fed to the roller compactor is below room temperature;
(iii) the roller compactor is cooled during the compression step;
wherein the density of the powder mixture before compression is from about 0.6 to 0.9 g/ml, and/or wherein the density of the chocolate or chocolate-like product after compression is from about 1.15 to 1.55 g/ml.

2. Process according to claim 1, wherein the cocoa solids are selected from cocoa powders, expeller flake and mixtures thereof; wherein the milk powders are selected from skimmed milk powder, whey powder, derivatives of whey powder, full cream milk powder and mixtures thereof wherein the sugars are selected from the group consisting of sucrose, fructose, glucose, dextrose and mixtures thereof wherein the fat is selected from the group consisting of cocoa butter, cocoa butter equivalents, butter fat or fractions thereof, palm oil or fractions thereof, coconut or fractions thereof, palm kernel oil or fractions thereof, interesterified mixtures of the above fats or fractions or hardened components thereof, or mixtures thereof.

3. Process according to claim 1 wherein the components are in solid form.

4. Process according to claim 1 wherein the components to be mixed together have a particle size of about 100 μm.

5. Process according to claim 1 wherein the components comprise a sugar and wherein the sugar is ground before being mixed with other components.

6. Process according to claim 1 wherein cocoa powder, milk powder and sugar are ground before being mixed with other components.

7. Process according to claim 1 wherein cocoa butter and cocoa liquor are used together in a crystalline form.

8. Process according to claim 1 wherein cooling is performed before, during and/or after the mixing step.

9. Process according to claim 1 wherein the flowable powder mixture that is fed to the roller compactor is at a temperature below room temperature, from about 10° C. to about 20° C.

10. Process according to claim 1, wherein the chocolate or chocolate-like product comprises fat in an amount of from about 5 to about 45% by weight.

11. Process according to claim 1 which does not involve liquefying the mixture of chocolate components.

12. A chocolate or chocolate-like product obtainable by a process defined in claim 1 wherein the particles of chocolate components have a particular size of less than about 150 μm.

13. A chocolate or chocolate-like product according to claim 12 wherein the chocolate components have a particle size of about 100 μm or less.

* * * * *